United States Patent [19]

Arquie et al.

[11] 4,334,300
[45] Jun. 8, 1982

[54] STIGMATIC OPTICAL DEVICE AND AN OPTICAL RECORDING HEAD EQUIPPED WITH SAID DEVICE

[75] Inventors: Louis Arquie; Claude Bricot; Jean-Claude Lehureau; Michel Thirouard; Jean-Pierre Le Merer; Dominique Leterme, all of Paris, France

[73] Assignee: Thomson-CSF, Paris, France

[21] Appl. No.: 208,005

[22] Filed: Nov. 18, 1980

[30] Foreign Application Priority Data

Nov. 21, 1979 [FR] France ................... 79 28694

[51] Int. Cl.³ .................................................. G11B 7/12
[52] U.S. Cl. ........................................ 369/46; 350/446;
357/19; 369/112; 369/122
[58] Field of Search .............. 346/76 L, 108; 350/446;
357/17, 19; 358/128.5, 127; 369/44, 45, 46, 110,
111, 112, 118, 120, 121, 122

[56] References Cited

U.S. PATENT DOCUMENTS

| | | | |
|---|---|---|---|
| 3,842,263 | 10/1974 | Kornrumpf et al. | 357/19 X |
| 3,941,945 | 3/1976 | Borner et al. | 369/122 X |
| 4,193,091 | 3/1980 | Kleuters et al. | 369/45 X |

FOREIGN PATENT DOCUMENTS

| | | |
|---|---|---|
| 2198203 | 3/1974 | France . |
| 2386051 | 10/1978 | France . |
| 55-28586 | 2/1980 | Japan ................... 369/122 |
| 55-45171 | 3/1980 | Japan ................... 369/122 |

OTHER PUBLICATIONS

Journal of Scientific Instruments, vol. 28, Nov. 1951, No. 5 Londres (GB) W. Weinstein et al; "A Beam—Splitter for Non—Collimated Light", pp. 351–352.

Primary Examiner—Bernard Konick
Assistant Examiner—Donald McElheny, Jr.
Attorney, Agent, or Firm—Oblon, Fisher, Spivak, McClelland & Maier

[57] ABSTRACT

An optical device for forming a stigmatic image of a laser source positioned at a predetermined point is intended to illuminate a reflecting surface while also providing a separation between the beam emerging from the source and the beam reflected from the surface. The device comprises a cube placed against a converging lens, the dimensions of the assembly thus formed being such that the cube face remote from the lens passes through a Weierstrass point of the spherical refracting surface formed by the lens. The laser source is positioned at the Weierstrass point. The cube is formed by two prisms cemented together, the interface being treated so as to have a polarization-separating effect.

11 Claims, 10 Drawing Figures

STIGMATIC OPTICAL DEVICE AND AN OPTICAL RECORDING HEAD EQUIPPED WITH SAID DEVICE

FIELD OF THE INVENTION

This invention relates to a stigmatic optical device for emitting and receiving coherent radiation, said device being more particularly intended for the detection of a reflecting surface.

SUMMARY OF THE INVENTION

The optical device in accordance with the invention performs both the function of emission of a beam from a semiconductor laser source while reducing the divergence of a laser of this type and the function of reception of the beam which is reflected by optoelectrical detection means, these two functions being perfectly decoupled. The device has a very small number of elements, is consequently of small size and entails the need for few adjustments. In particular, it utilizes the known property of spherical refracting surfaces with which two stigmatic points or so-called Weierstrass points can be associated, said points being located on the concave side of the spherical refracting surface.

A noteworthy application of the device is an optical head for recording and reading by reflection from an optical disk. The flexibility of operation, or in other words the possibility of employing either one or two lasers with decoupling between the beams makes it possible to employ the device for reading and recording as well as control in certain cases and to carry out simultaneously the detection of focusing errors and the detection of radial tracking. The head thus obtained can be of compact and lightweight construction whilst adjustments can easily be performed without entailing the need for an objective which has a wide field and is therefore costly.

The invention relates to a stigmatic optical device for emission and reception of coherent radiation, comprising at least one semiconductor laser source and optoelectronic detection means, and a refracting optical block delimited by a first plane face and a convex face of spherical shape. One of the Weierstrass points of the spherical refracting surface formed by this convex face is located on the plane face and this latter is perpendicular to the straight line which joins said Weierstrass point to the center of said convex face of spherical shape, the laser source being placed in the vicinity of said point.

BRIEF DESCRIPTION OF THE DRAWINGS

These and other features of the invention will be more apparent to those skilled in the art upon consideration of the following description and accompanying drawings, wherein.

DESCRIPTION OF THE PREFERRED EMBODIMENT

Figure 1:
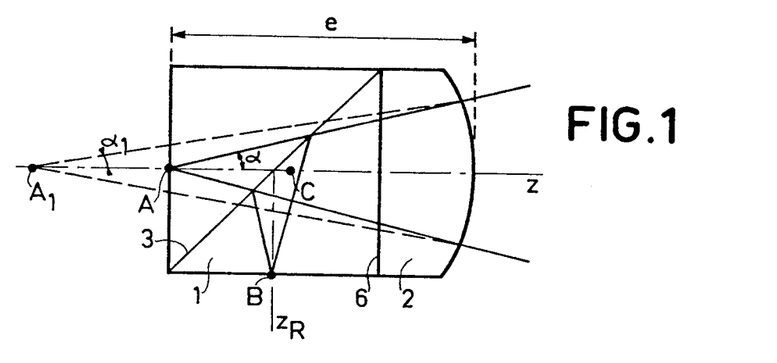
FIG. 1 illustrates an optical device in accordance with the invention.

The optical device in accordance with the invention as shown in FIG. 1 comprises a parallelepiped 1. Unless otherwise stated, the parallelepiped under consideration is a cube formed by two joined prisms. The interface 3 constituted by the hypotenuse of the two cubes is treated so as to form a polarization-separating surface which accordingly transmits all radiation having a given polarization and reflects all radiation having a polarization at right angles to the polarization preceding. A plano-convex lens 2 formed of the same material as the cube is cemented to one of the faces 6 of the cube 1. The center C of the sphere formed by the convex face of the lens 2 is located on a midplane of the cube. The radius of curvature R of the sphere is such that the point A located at the point of intersection of the optic axis z of the lens 2 with the cube face opposite to the face 6 is a Weierstrass point of the spherical refracting surface of the lens 2. In other words, the optical block constituted by the cube 1 and the lens 2 forms a stigmatic image of the point A at the point $A_1$ which is known to be virtual if A is real. The Weierstrass conditions are: when the refractive index which is common to the cube and to the lens is n and when the external medium is air: $CA = R/n$, $CA_1 = nR$. The first condition gives the relation between the thickness e of the lens assembly and the radius R: $R = e \cdot n/n + 1$. When this relation is verified, if there is placed at A a source of radiation which is polarized in the direction corresponding to a transmission by the face 3 and which emits a divergent beam having a semivertical angle $\alpha_o$ in air, this angle becomes $\alpha$ within the cube and the beam emerging from the lens and derived from the virtual point $A_1$ has a semivertical angle $\alpha_1$ with $\sin \alpha_1 = (\sin \alpha)/n$ and $\sin \alpha = (\sin \alpha_o)/n$. Moreover, since the element 1 is cubic, the point B which is the conjugate of A with respect to the face 3 is located on another face of the cube and is also a stigmatic point, with the result that a beam which is convergent on the virtual point $A_1$, which falls on the lens 2 and has a direction of polarization at right angles to the preceding is reflected from the face 3 and converges at the point B. Conversely, a beam issuing from the point B which is polarized at right angles to the beam issuing from the point A is reflected from the face 3 and superimposed on the beam issuing from A. The fact that the parallelepiped 1 and the lens 2 are described as two separate elements is not a necessary feature of the invention. The design of the optical block 1, 2 can also be such that the face 6 is not present.

Figure 2:
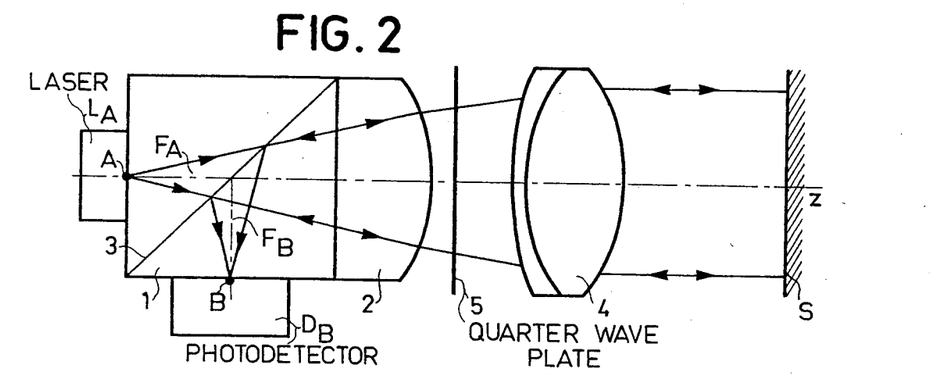
FIG. 2 illustrates a first mode of utilization of the invention.

The device herein described is intended to be employed in conjunction with a semiconductor laser $L_A$ having a phase center A and an optoelectrical detection means centered on the point B or in the vicinity of B. The respective functions of A and B may be reversed or, in other words, the detection means may be located at A and therefore on the axis z while the laser is located at the conjugate point B. FIG. 2 illustrates a first mode of utilization of the invention. A collimating objective 4 having an optic axis which coincides with the axis z is placed behind the lens 2 so that its focus should be located at the point $A_1$ (shown in FIG. 1). This objective is so designed that it does not exhibit any spherical aberrations in the case of the maximum values of angular beam divergence produced by the laser placed at A, the lens system being intended to remain stigmatic. By way of example, the lens can consist of a doublet, with the result that there is therefore obtained a parallel beam which illuminates a reflecting surface S. If this surface is perpendicular to the axis z, the reflected beam coincides with the incident beam. In order to ensure that this beam is focused at B, it is necessary to ensure that its direction of polarization is at right angles to the direction of polarization of the beam issuing from A. To this end, a quarter-wave plate 5 is placed on the path which is common to the incident and reflected beams, either between the lens 2 and the objective 4 or between the objective 4 and the surface S. The quarter-wave plate 5 is oriented at 45° to the polarization of the incident beam, with the result that circular polarization is obtained after a single traversal through the plate and that linear polarization is again obtained after a two-trip traversal but at 90° with respect to the initial polarization. This separation between the beam issuing from the laser and the reflected beam could be performed if necessary without a quarter-wave plate and with an interface 3 which is not a polarization-separating surface but simply a semitransparent surface. The detection means $D_B$ placed at B or in the vicinity of B serves on the one hand to detect the presence of the surface S and on the other hand to measure certain characteristics of the reflected beam such as intensity, spatial distribution and so forth. By way of example, a photodiode centered on B makes it possible to determine the coefficient of reflection of the surface S. Should the surface S not be perpendicular to the axis z, the reflected beam may not coincide with the incident beam and may therefore not be brought to a focus at B. It is only necessary to place a matrix of detecting cells on the corresponding face of the cube 1 in order to determine the relative positional displacement and hence to deduce the angle of the surface S with respect to a plane perpendicular to z.

Figure 3:
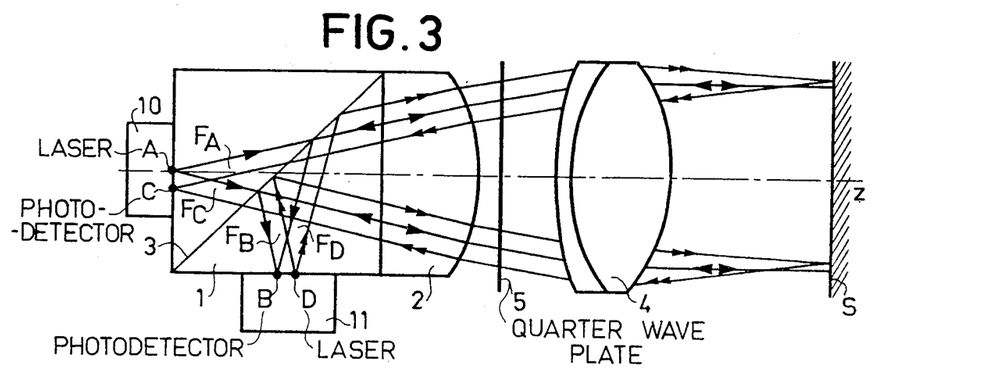
FIG. 3 illustrates a second mode of utilization of the invention.

In some applications, it may prove useful to associate two light sources with the device. This second mode of utilization as shown in FIG. 3 is based on the fact that, while the conditions of stigmatism are satisfied only by the points A and B, a negligible astigmatism is introduced by points located in very close proximity. A first semiconductor laser is therefore placed at A. After passing through the quarter-wave plate 5 and through the objective 4 followed by reflection from the surface S and a return trip, the beam $F_A$ forms a beam $F_B$ which is focused at B. A second semiconductor laser is positioned on the same face of the cube as the point B but relatively displaced to a slight extent. This second laser delivers a beam $F_D$ which is polarized at 90° with respect to the beam $F_A$. The beam reflected from the surface S, $F_C$ is focused at the point C which is located on the same face as the point A and displaced with respect to the latter. The relative positional displacements on the one hand between A and C on the other hand between B and D must be sufficient to permit positioning of a semiconductor laser and of a detector such as a photodiode, for example, which can be placed within a single casing and are designated respectively by the reference numerals 10 and 11. Typically, the minimum possible positional displacements are of the order of 50 μm. The lasers positioned at A and D are not necessarily identical or of the same wavelength. In the event of different wavelengths, chromatic aberration must be taken into acount in the positioning of the lasers, in which case the element is no longer a true cube.

Figure 4:
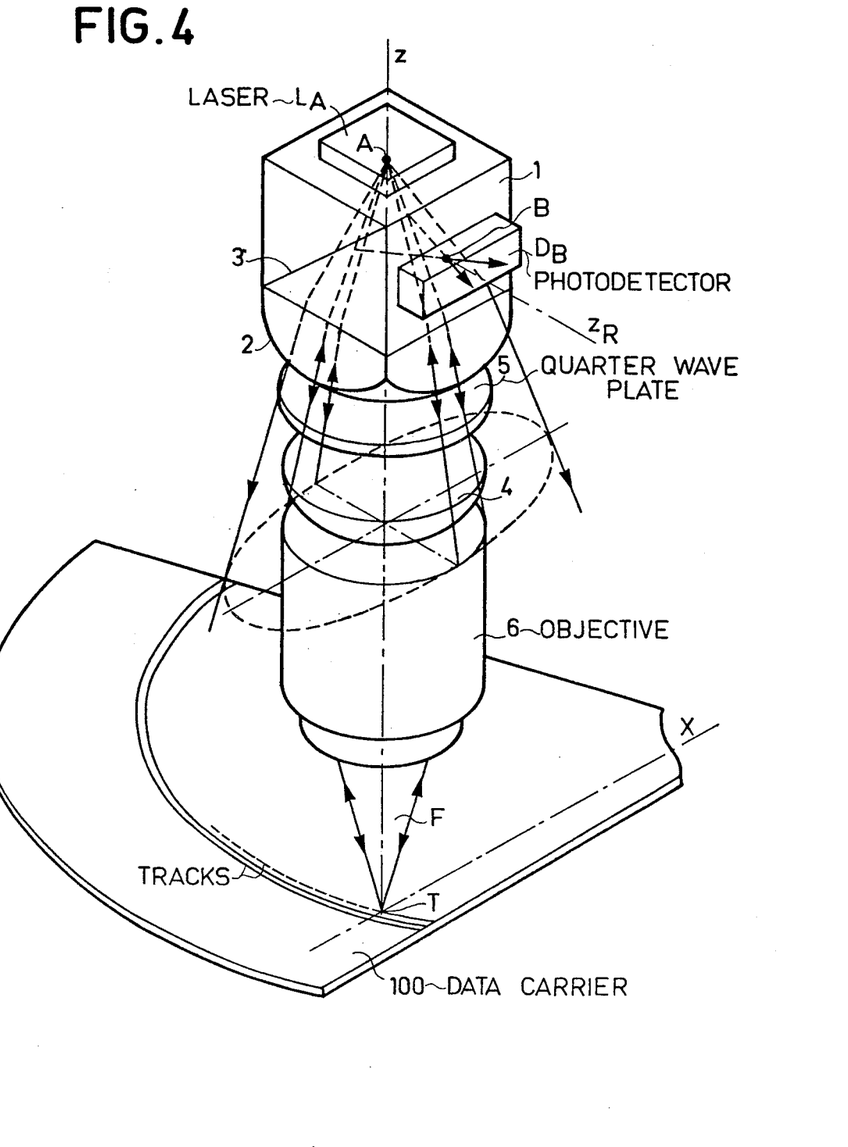
FIG. 4 illustrates a first embodiment of an optical head for an optical disk.

The invention is applicable in particular to the field of recording and reading of an information medium such as an optical disk. FIG. 4 illustrates one embodiment of an optical head in accordance with the invention and entailing the use of the device shown in FIG. 2. The same optical head may be employed for recording and then for reading of a reflecting disk 100 which is driven in rotational motion while the head is driven in radial motion. An optical head of this type is intended to form a quasipunctual spot T from the beam F delivered by a laser. Said spot describes a track in the form of a spiral or in the form of concentric circles as a result of the combination of the rotational motion and the radial motion. The beam F is delivered by a laser $L_A$ which is modulated by the information to be written in the case of recording and which delivers continuous power in the case of reading. This laser is placed at the point A of the optical emitting and receiving device described earlier with reference to FIG. 2. There is placed behind this device a focusing objective 6 having the same optic axis z and so arranged that the parallel beam delivered by the objective 4 is focused in the plane of the disk 100. Since the laser $L_A$ is a semiconductor laser, its radiation pattern is not isotropic. The angular beam-divergence of the laser can be of the order of 10° for example, in the direction of the large dimension of the emission face and of the order of 25° in the perpendicular direction, with the result that the projection of the parallel beam in the plane of the entrance pupil of the objective 6 is elliptical. The ratio between the major axis and the minor axis of the ellipse is of the order of 4 in the case of conventional lasers and can be as low as 1.5 in the case of certain types of lasers. Especially in order to facilitate readout, it is preferable to obtain a circular spot T and therefore a beam F having a circular divergence. It is for this reason that the size of the entrance pupil of the objective is chosen as a function of the minor axis of the ellipse, with the result that this pupil has a diaphragm effect. This produces a loss of power which is unimportant if the laser $L_A$ has sufficient power. By way of illustration, in a method of writing by cutting as applied to optical recording of digital data with a bit rate of 10 Mbits/s, the minimum energy required for recording is approximately 3 mW. The losses introduced by the different elements of the optical head, especially the diaphragm effect at the level of the objective 6, can be estimated at approximately 75% of the energy delivered by the laser $L_A$, thereby entailing the use of a laser having a minimum peak power of 12 mW. The information to be recorded is in the form of a binary electrical signal which is applied to the laser so as to produce a power variation at two levels such as 0 and 15 mW, for example. In the case of readout, the same laser can be employed by reducing its power so as to ensure that the reading spot does not produce any cutting action (a power level of 1 mW is sufficient). The use of the same laser makes it possible to retain the same head while making it necessary to change only the electrical control of the laser. It is also possible to employ two separate heads with two different lasers. In all cases, provision can be made for a power follow-up control which is carried out in accordance with a conventional technique based on the fact that a semiconductor junction emits radiations in two opposite directions. By placing a photodetector on the rear face of the laser $L_A$ in order to ensure that this latter receives the radiation emitted in the direction opposite to the disk, there is thus provided an indication of the emitted power which can be maintained constant by means of a feedback loop.

The beam reflected from the surface of the disk 100 is separated from the beam emitted by the laser by means of the quarter-wave plate 5 and the interface 3. When the beam F is perfectly focused on the disk and forms a quasi-punctual spot T, the return beam $F_B$ is focused at the point B. At the time of reading, the power of the beam $F_B$ which can be detected at the point B or in the vicinity of the latter by detection means $D_B$ is a function of the state of surface of the disk at the point T. The presence of a cut impression forming a hollow indicates either an absence or a reduction of the reflecting power of the disk. On the contrary, in the uncut regions, the beam is totally reflected. Thus the power of the beam $F_B$ is modulated progressively as the rotational motion of the disk and the radial displacement of the head take place, at the rate of modulation of relief previously written on the disk. Moreover, both during recording and reading, it is desirable to ensure that the detection means $D_B$ are capable of detecting focusing errors (the point T is not located exactly in the plane of the disk) as expressed in the form of a relative displacement on the axis z and of detecting radial tracking errors (the point T is not located on the cut track in the case of reading or on the track which it is desired to cut and which is usually materialized in the form of a pre-cut track in the case of recording), said radial tracking errors being expressed in the form of a relative displacement of the disk 100 on the radial axis X. The methods of error detection which are known in the field of optical recording can be adapted to the particular configuration of the optical head of FIG. 4.

Figure 5:
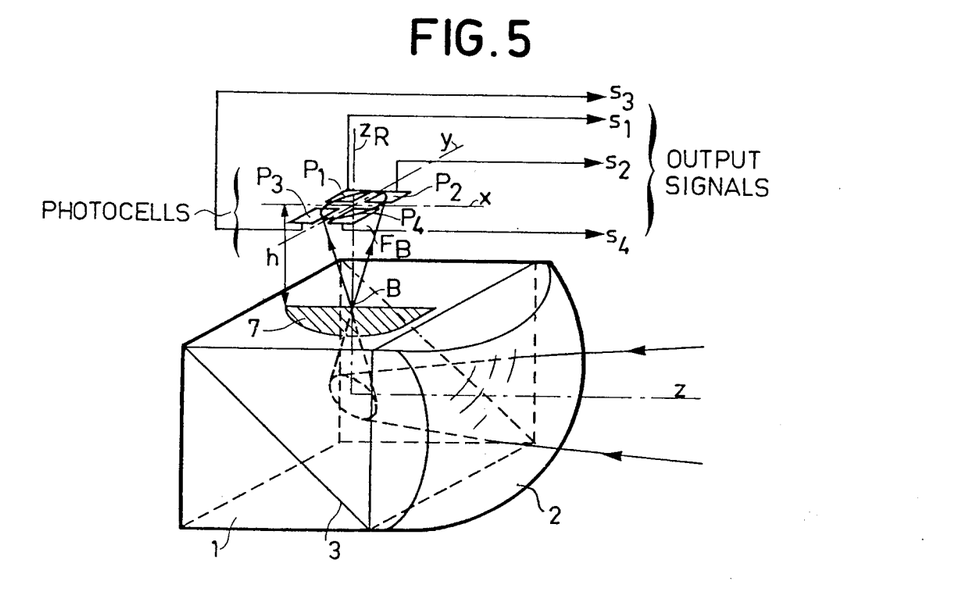
FIGS. 5, 6, and 7 illustrate a method of error detection which uses the optical head of FIG. 4.

A first embodiment of the detection means is illustrated in FIG. 5. This embodiment makes it possible to obtain a radial tracking error signal, a focusing error signal and possibly a read output signal if necessary. The detection means comprise four photodiodes $P_1$, $P_2$, $P_3$, $P_4$ located in a plane x, y which is parallel to that face of the cube containing the point B, at a distance h from said face. The four photodiodes are arranged in a square about the axis $z_R$ and separated by the axes x and y but as close as possible to each other and in such a manner as to ensure that, when no error occurs, the power of the beam $F_B$ is equally distributed within the four photodiodes. The distance h is chosen so as to ensure that, either with or without errors, the spot formed in the plane x, y by the beam $F_B$ is entirely covered by the photodiodes so as to ensure that these latter detect practically the full power of the beam $F_B$. Thus the sum of the respective output signals $s_1$, $s_2$, $s_3$, $s_4$ indicates the presence or absence of an impression on the disk at the location of the spot T and therefore constitutes a read output signal. In the absence of any error, the beam $F_B$ is focused at B and the spot obtained in the plane x, y is circular and centered on the axis $z_R$. In the event of a radial tracking error or in other words (with reference to FIG. 4) when the focusing point T is displaced along the axis x with respect to the pre-cut track or with respect to the information-carrying track, only a portion of the beam F is reflected and the light intensity is no longer equally distributed between the four photodiodes since the spot is displaced along the axis x if the direction of this latter is chosen so as to ensure that a relative displacement of the beam $F_R$ along the axis x corresponds to a relative displacement of the spot T along the axis X. A radial tracking error signal is therefore obtained from the expression $(s_1+s_3)-(s_2+s_4)$.

Figure 6:
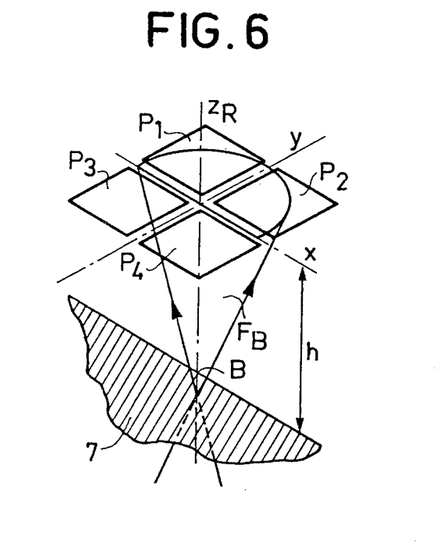
Figure 7:
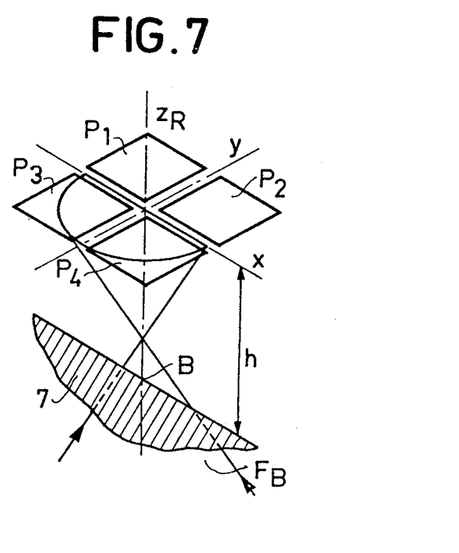

For detecting focusing errors, a mask 7 is placed on that face of the cube 1 which contains the point B. This mask has one rectilinear side which passes through B and is parallel to the axis x. When no error is detected, the mask 7 has no effect since the beam $F_B$ is focused at B. As a result of a focusing error and depending on its sign, a point of convergence is obtained either within the interior or externally of the cube 1 but always on the axis $z_R$. In FIG. 6, the point of convergence is located within the interior of the cube. The mask 7 cuts-off a half-pupil of the beam $F_B$, with the result that only the photodiodes $P_1$, $P_2$ are illuminated. In FIG. 7, the point of convergence is located externally of the cube. The mask 7 performs the same function as before but its image on the detection plane is reversed, with the result that only the photodiodes $P_3$, $P_4$ are illuminated.

The sign of the focusing error is therefore given by the sign of the expression $(s_1+s_2)-(s_3+s_4)$.

Figure 8:
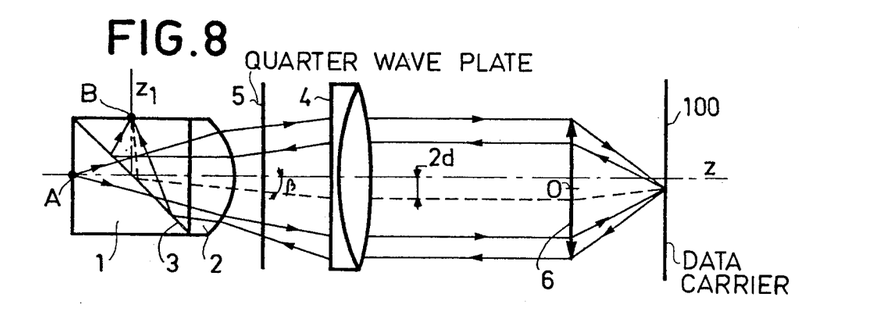
FIG. 8 illustrates another method of error detection.

Another means for detecting a focusing error which is of more simple design than the arrangement described above and easier to apply in practice calls for a high degree of accuracy in the position of the mask and is illustrated in FIG. 8. The method adopted, the so-called asymmetrical method, consists in producing a relative displacement d between the axes of the optical system 1, 2, 3, 4 and the axis of the objective 6. This relative displacement may simply result from a faulty adjustment of the alignment. Since the axis z of the optical system 1, 2, 3, 4 does not pass through the optical center O of the objective 6, the beam reflected by the device 100 no longer coincides with the incident beam, even in the absence of any focusing error; the two beams are relatively displaced by 2d. This accordingly results in an angular displacement after passing through the lens 4. The beam converges to the point B but its axis forms an angle with the axis $z_1$. Defocusing then produces, in a detection plane parallel to the face of the cube 1, a displacement of the light spot which can be detected as in the previous instance by means of two photodetector cells so arranged as to receive the same fraction of light energy when the focusing error is zero. The radial tracking error is detected in the same manner as before, with the result that provision has to be made for four cells. Steps must also be taken to ensure that the directions of displacement of the light spot to be detected are perpendicular and therefore that the relative displacement d produced between the axis z and the optic axis of the objective corresponds to a relative displacement on the disk in a direction which is tangential to the recorded grooves. Instead of placing the four photodetector cells in a parallel plane of the cube, it is feasible to place them on that face of the cube which contains the point B, provided that the spacing between said cells is smaller than the minimum diameter of the spot formed at B. By way of indication in the case of a laser $L_A$ in which the dimensions of the emission pupil are 2 $\mu$m×5 $\mu$m, the spot formed at B has a diameter of the order of 5 $\mu$m. Certain techniques for the fabrication of photodiodes make it possible to obtain a spacing of approximately 1 $\mu$m which is therefore smaller than the diameter of the light spot.

Figure 9:
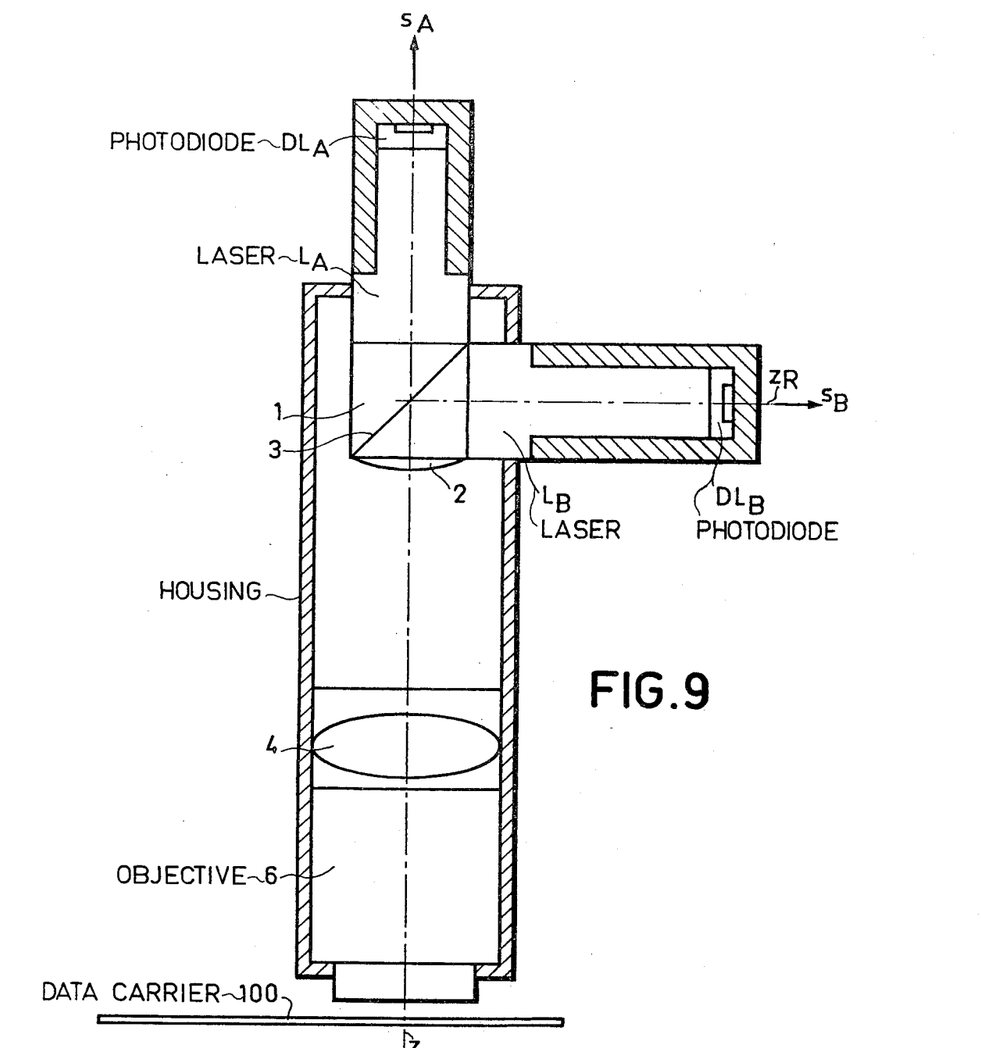
FIG. 9 illustrates a second embodiment of an optical head for an optical disk.
Figure 10:
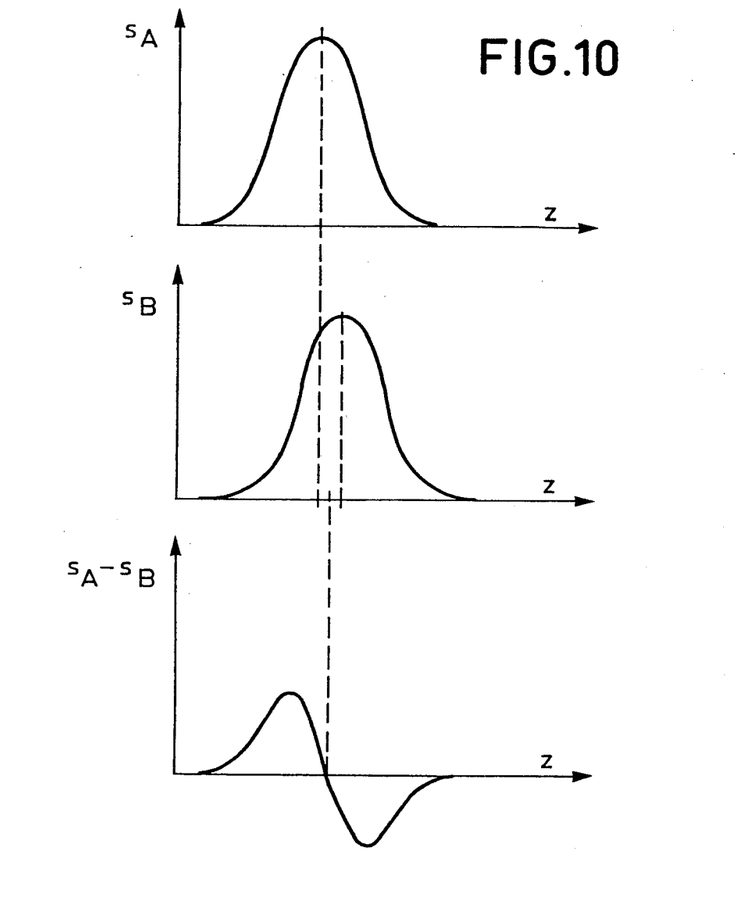
FIG. 10 illustrates a method of error detection which uses the optical head of FIG. 9.

In accordance with another embodiment of optical head, provision is made for two semiconductor lasers, one laser being modulated and intended for recording while the other is intended for reading, thus permitting control of recording progressively as this latter takes place. A means for associating two lasers and two photodetectors with the block 1, 2 has already been described with reference to FIG. 3. However, the actual fabrication of this system proves difficult in practice for technological reasons. In the optical head shown in FIG. 9, the problem of placing two optoelectronic elements very close together on one and the same face has been circumvented. This has been achieved by utilizing a property of semiconductor lasers which consists of an increase in light power emitted by a semiconductor laser when part of said power is reinjectd into the laser. Thus the presence of a mirror opposite to the optical device in accordance with the invention produces a power rise which is readily detected at the opposite end of the laser. The device of FIG. 9 therefore comprises two lasers $L_A$ and $L_B$, the phase centers of which are positioned near the points A and B, and two photodiodes $DL_A$ and $DL_B$ mounted against the respective rear faces of the two lasers. The reading spot obtained on the disk must be slightly displaced to the rear with respect to the recording spot, in the same groove. This relative displacement is obtained practically automatically as a result of the positioning errors since perfect coincidence between the two lasers and the points A and B is not possible in practice. A fine adjustment of the positions of the two spots is carried out by rotating the block 1, 2 with respect to the axis z. Moreover, as will become apparent hereinafter and in order to permit detection of focusing errors, the two phase centers are not strictly conjugate with respect to the face 3 but are relatively displaced to a slight extent on the axes z and $z_R$. The unmodulated laser $L_B$ has a direction of polarization at right angles to that of the laser $L_A$. The head is not provided with a quarter-wave plate in order to ensure that the beam emitted by the laser $L_A$ is reinjectd into this latter and that the beam emitted by the laser $L_B$ is also reinjected into this latter. The disk performs the function of a mirror only in its non-cut portions. The presence of a cut impression reduces the light power of the reflected reading beam and therefore the power emitted by said laser and detected by the photodiode $DL_B$ which therefore delivers at the output a readout signal $s_B$. A focusing error indication is obtained from the difference between the output signals of the two photodiodes $s_A$ and $s_B$ by virtue of the relative displacement on the axis z between the two lasers mentioned earlier. There can in fact be seen in FIG. 10 the variations of the signals $s_A$ and $s_B$ as a function of the abscissa on the axis z of the disk 100. Each curve passes through a maximum when the corresponding beam is focused on the disk. However, since the two beams are not well focused simultaneously, the curve of variation of the difference $s_A-s_B$ not only provides an indication of defocusing but also the sign of the focusing error; this second indication is not provided by the signals $s_A$ and $s_B$ alone. In the application of this method, due consideration must be given to the fact that one of the beams is modulated while the other beam is not modulated. The type of modulation is therefore chosen so as to ensure that the light intensity is never zero since this would have the effect of suppressing the signal $s_A$. By way of example, a modulation can be provided at two levels: 1 mW, 15 mW, while the power of the read laser $L_B$ remains continuously equal to 1 mW. The variations in the signals $s_A$ and $S_B$ arising from the modulation may be eliminated by filtering since they usually have a much higher frequency than the error frequency. As in the case of the single-laser optical head shown in FIG. 4, a system for power control of the lasers can be provided.

In order to obtain a radial tracking error signal, one means consists of a pre-cut track which is wobbulated at a predetermined frequency and formed on the disk before carrying out any recording operation. A detection which is synchronous with the reading signal with respect to the wobbulation signal provides the tracking error in accordance with a method in common use for this type of detection. The signals $s_A$ and $s_B$ may be employed for this purpose. The control loop must be so designed as to be slower than the error variations in order to avoid any interference with detection of said errors since these latter are zero at mean values.

The invention is not limited to the embodiments and forms of construction of an optical head as described in the foregoing, especially in regard to the mode of detection of errors and therefore to the structure of the optoelectrical detection means. Irrespective of the mode of detection employed, correction of errors as a function of the error signals obtained can be carried out in a conventional manner, for example by means of a motor which is rigidly fixed to the head as described in the French patent Application filed by the present Applicant under No. 78 34 649 and published under No. 2,443,734.

Moreover, the embodiments hereinabove described relate to compact optical heads in which all the elements are mechanically coupled. It may be preferable to separate the objective 6 and the emitting and receiving device constituted by the block 1, 2 associated with the lasers and with the detection means, by the doublet 4 and also by the quarter-wave plate 5 when this latter is necessary. The optical head is accordingly constituted by two mechanically separate portions: the stationary emitting and receiving device and a movable element consisting of the objective and of a reflecting mirror. For the detection of errors in accordance with the asymmetrical method hereinabove described, it is necessary to ensure that the photodetector cells are in the plane which contains the point B.

What is claimed is:

1. A stigmatic optical device for emission and reception of coherent radiations, comprising at least one semiconductor laser source and optoelectronic detection means, and a refracting optical block delimited by a first plane face and a convex face of spherical shape, one of the Weierstrass points of the spherical refracting surface formed by said convex face being located on said plane face, said plane face being perpendicular to the straight line which joins said Weierstrass point to the center of said convex face of spherical shape, the laser source being placed in the vicinity of said point.

2. An optical device according to claim 1 and further comprising stigmatic collimating means located on the path of the beam of said laser source externally of said refracting optical block so that said beam may thus be made parallel.

3. An optical device according to claim 2, wherein said optical block is constituted by a parallelepiped placed against a plano-convex lens.

4. An optical device according to claim 3 for illuminating a reflecting surface placed on the path of said parallel beam and for detecting the radiation reflected from said surface, wherein said parallelepiped is constituted by two right prisms cemented together, the interface between the two prisms being inclined along the line bisecting the dihedron formed by the first plane face and another plane face of said parallelepiped and being transmissive in respect of the beam emerging from said laser source and being reflected in respect of the beam reflected from said reflecting source, said detection means being placed in the vicinity of the conjugate point of said laser source with respect to said interface.

5. An optical device according to claim 4 wherein, the beam which emerges from said laser source being linearly polarized and said interface being intended to perform the function of a polarization selector so as to transmit said beam, the device further comprises birefringent means located on the path of the beams on the convex side of said optical block in order to ensure that the polarization of the reflected beam is at 90° to the polarization of the beam which emerges from said laser source.

6. An optical device according to claim 5, wherein said birefringent means are constituted by a quarter-wave plate.

7. An optical device according to claim 3 for illuminating a reflecting surface placed on the path of said parallel beam, wherein the parallelepiped aforesaid is constituted by two right prisms cemented together and further comprising a second semiconductor laser source placed in the vicinity of the conjugate point of said first laser source with respect to said interface, the interface between said two right prisms inclined along the line bisecting the dihedron formed by the first plane face and another plane face of said parallelepiped and being transmissive in respect of the beam emerging from the first laser source aforesaid and reflecting in respect of the beam emerging from the second laser source aforesaid.

8. An optical device according to claim 7, wherein the beams emerging from the two laser source aforesaid are linearly polarized respectively at 90° to each other, said interface being intended to provide a polarization-separating surface in order to transmit the beam emerging from the first laser source aforesaid.

9. An optical device according to claim 7, wherein said detection means comprise at least two detectors for collecting respectively the radiations emitted by the rear ends of the two laser sources aforesaid.

10. A recording and reading head of a movable information-carrying medium for optical recording or reading by reflection by means of focused radiation, comprising a device for emitting at least one parallel reading-recording beam, an objective for focusing said beam on a predetermined track of said medium, and an emitting and receiving device according to claim 1; wherein the device for emitting is positioned so that the reading-recording beam is focused by the objective onto a predetermined track of the medium and the emitting and receiving device is positioned so as to receive the reading-recording beam reflected from the medium and derive therefrom signals indicative of information contained in the medium.

11. A recording and reading head of a movable information-carrying support for optical recording and reading by reflection by means of focused radiation, comprising a laser for emitting a recording beam, a laser for emitting a reading beam, a focusing objective and an emitting and receiving device according to claim 9, the two lasers being positioned in such a manner as to ensure that the emitted beams are focused by said objective on two points which are displaced with respect to the axis of the objective, the difference between signals delivered by said two detectors being characteristic of the focusing error.

* * * * *